No. 658,116. Patented Sept. 18, 1900.
O. A. PACKER.
SCREW GEARING.
(Application filed Jan. 26, 1900.)
(No Model.)
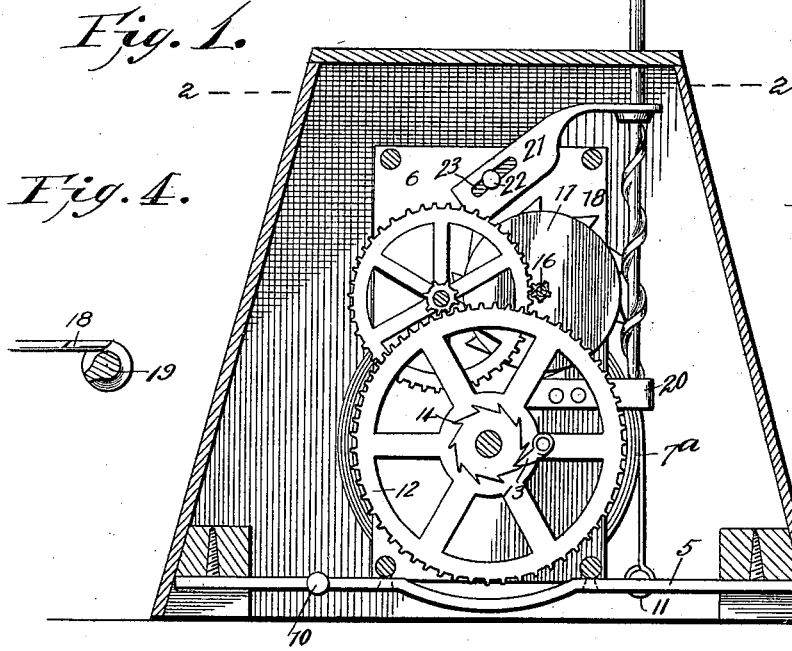
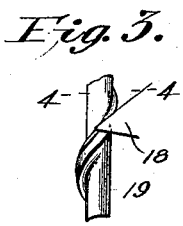
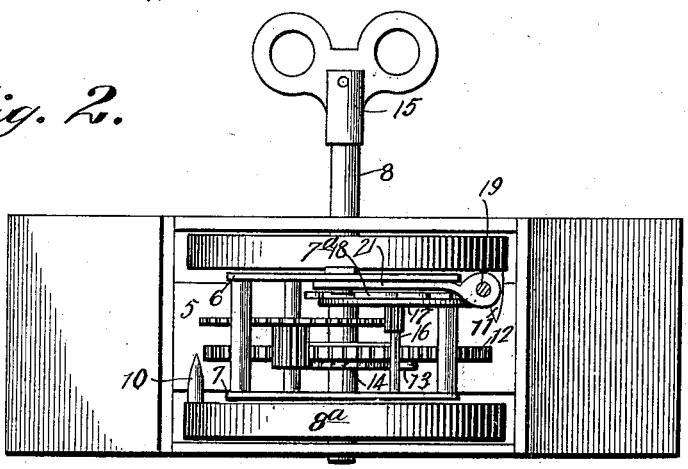
Witnesses
C. H. Walker.
Geo. H. Chandlee.
O. A. Packer Inventor
By his Attorneys,
C. A. Snow & Co.
THE NORRIS PETERS CO., PHOTO-LITHO., WASHINGTON, D. C.

UNITED STATES PATENT OFFICE.

OREN A. PACKER, OF SOUR LAKE, TEXAS, ASSIGNOR OF ONE-HALF TO G. R. ENLOE, OF SAME PLACE.

SCREW-GEARING.

SPECIFICATION forming part of Letters Patent No. 658,116, dated September 18, 1900.

Application filed January 26, 1900. Serial No. 2,909. (No model.)

*To all whom it may concern:*

Be it known that I, OREN A. PACKER, a citizen of the United States, residing at Sour Lake, in the county of Hardin and State of Texas, have invented a new and useful Screw-Gearing, of which the following is a specification.

This invention relates to motors in general, and more particularly to that class employed for operating fans and similar devices, whether energized by a spring or from any other source, and while it is particularly adapted for use in driving a fan the same principles will be involved when the fan-shaft of the present structure is substituted by a governor-shaft or any other similar portion of the mechanism.

One object of the invention is to provide means for transmitting motion to a driven shaft from a second shaft disposed at an angle thereto and at the same time to maintain a constant speed of the driven shaft, a further object of the invention being to provide means for adjusting the position of the driven shaft to compensate for wear of the parts.

In the drawings forming a portion of this specification, and in which similar numerals of reference designate like and corresponding parts in the several views, Figure 1 is a vertical section taken transversely of the main shaft of the motor at one side of the gearing that is driven therefrom and illustrating the form and position of the fan-shaft and the means for rotating it. Fig. 2 is a section on line 2 2 of Fig. 1 looking downwardly. Fig. 3 is a detail elevation showing a portion of the toothed wheel and illustrating the engaging positions of the teeth thereof with the thread of the fan-shaft. Fig. 4 is a section on line 4 4 of Fig. 3.

Referring now to the drawings, the motor proper of the present invention is supported by a frame comprising a base 5, to which are fixed uprights 6 and 7 in the form of plates arranged parallel.

Journaled in the plates 6 and 7 is a main shaft 8, with which are connected the inner ends of two spiral springs 7ª and 8ª, disposed concentric therewith and having their outer ends attached to pins 10ª and 11.

Mounted loosely upon the shaft 8 and between the plates 6 and 7 is a main drive-gear 12, carrying a pawl 13, which is in operative relation to a ratchet-wheel 14, fixed upon the shaft. This is the usual arrangement of parts to insure rotation of the gear 12 when the springs 9 and 10 are wound upon the shaft 8 by means of a key 15.

A train of gearing is connected with the gear 12 and may include any number of shafts provided with intermeshing wheels of various sizes to secure the proper speed of rotation of a final shaft 16, upon which is fixed a wheel 17, having angular teeth 18. The front faces of these teeth lie substantially radially of the wheel, while the rear faces approach the respective tangents from the apices of the teeth.

In the path of rotation of the teeth 18 is a driven shaft 19, the lower end of which is journaled in a projection 20 of the plate 6, while the upper portion is adapted to turn in a bearing at the outer end of a plate 21, which is secured to the plate 6 through the medium of a bolt 22, passed through a slot 23, formed longitudinally thereof, this mounting of the plate 21 permitting its adjustment to move the shaft 19 toward and away from the teeth 18. The shaft 19 has a worm upon its lower portion between the plate 21 and the bearing 20, the upper face of which slants downwardly in planes taken longitudinally and radially of the shaft, as illustrated most clearly in Fig. 3 of the drawings. This shaft is so disposed that the teeth 18 do not rotate in the same plane with a radius of the shaft; but instead they are positioned to engage the upper face of the worm entirely at one side of the shaft, so that the teeth tend to pass beyond the shaft. Furthermore, the ends of the teeth are beveled on their sides adjacent the shaft, so as to fit closely to the curve of the worm, as shown in Fig. 4, and thus the teeth may engage the worm at their points, and by forming the teeth of suitable length the points of the teeth may travel in a direction transversely of the shaft to an extent sufficient to maintain engagement of the teeth with the worm at all times and in such position as to secure the most effective result.

Upon the upper end of the shaft 19 is fixed a head having radial arms 25, which are hollow and in which are disposed the ends of fan-blades 26, which latter are arranged in what is known as a "feathering" position, so as to direct a current of air either toward or away from the motor, depending upon the direction of rotation and the direction of slant.

While in the present structure the shaft 19 is shown as driven from the springs 7ª and 8ª, which form the source of energy, it will of course be understood that the shaft 16, which carries the wheel 17, may be driven in any manner and from any suitable source. Furthermore, it will be understood that any system of gearing may be employed between the shaft 16 and its source of energy and that any suitable materials and proportions may be used without departing from the spirit of the invention.

What is claimed is—

1. The combination with a shaft provided with a worm, of a wheel provided with radially-extending teeth and adapted to rotate in a plane at one side of the shaft and operatively engage the worm to rotate the shaft, and means for adjusting the worm bodily in a plane parallel to the ratchet-wheel to compensate for wear of the extremities of the ratchet-teeth.

2. The combination with a shaft provided with a worm, of a wheel disposed adjacent to the shaft and having radially-extending teeth disposed for rotation in a plane at one side of the shaft to engage the extremities of the teeth with the face of the worm, the extremities of the teeth being beveled on their sides adjacent to the shaft, and means for adjusting the worm bodily in a plane parallel to the ratchet-wheel to compensate for wear of the extremities of the ratchet-teeth.

In testimony that I claim the foregoing as my own I have hereto affixed my signature in the presence of two witnesses.

OREN A. PACKER.

Witnesses:
J. N. VOTARD,
F. H. VOTARD.